United States Patent [19]
Fertl

[11] 3,894,584
[45] July 15, 1975

[54] DETERMINATION OF RESIDUAL OIL IN A FORMATION

[75] Inventor: Walter H. Fertl, Ponca City, Okla.

[73] Assignee: Continental Oil Company, Ponca City, Okla.

[22] Filed: Nov. 28, 1973

[21] Appl. No.: 420,190

[52] U.S. Cl. .............. 166/250; 166/252; 166/274; 250/260
[51] Int. Cl. ................... E21b 47/00; E21b 49/00
[58] Field of Search...... 166/250, 64, 252, 273–275; 73/151, 152, 155; 250/260, 259

[56] References Cited
UNITED STATES PATENTS

| | | | |
|---|---|---|---|
| 2,429,577 | 10/1947 | French, Jr. | 166/250 UX |
| 2,553,900 | 5/1951 | Doan et al. | 166/252 |
| 2,916,916 | 12/1959 | Holsclaw | 166/252 UX |
| 3,170,513 | 2/1965 | Den et al. | 166/274 |
| 3,249,157 | 5/1966 | Brigham et al. | 166/273 |
| 3,254,714 | 6/1966 | Gogarty et al. | 166/274 |
| 3,345,868 | 10/1967 | Ten Brink | 166/250 X |
| 3,373,809 | 3/1968 | Cooke, Jr. | 166/274 X |
| 3,590,923 | 7/1971 | Cooke, Jr. | 166/252 |

*Primary Examiner*—Stephen J. Novosad
*Attorney, Agent, or Firm*—F. Lindsey Scott

[57] ABSTRACT

A method for determining the amount of residual oil present in an oil bearing formation after primary production comprising the sequential steps of:
  a. logging the formation to obtain logging data measurements as to the natural radioactivity of the formation;
  b. injecting into the formation, through the bore hole of said well, an aqueous solution containing water-soluble radioactive contaminants;
  c. logging the formation for a second time to obtain radioactivity logging measurements of the formation, such measurements being indicative of relative quantities of residual oil and formation waters present in the formation;
  d. injecting into the formation, through the bore hole of the well, a sufficient amount of an oil miscible solution to displace substantially all of the residual oil in the formation surrounding the bore hole;
  e. injecting into said formation, through the bore hole of said well, a sufficient amount of water to displace substantially all of the oil miscible solution in said formation thereby rendering same substantially 100% water saturated; and,
  f. logging the formation for a third time to obtain radioactivity logging data measurement which, when compared with the logging data measurements of the first and second log, in combination with the porosity of said formation and the concentration of radioactive contaminates employed, indicates the amount of residual oil present in said formation.

10 Claims, No Drawings

DETERMINATION OF RESIDUAL OIL IN A FORMATION

BACKGROUND OF THE INVENTION

1. Field of the Invention

This invention relates to a method of logging subterranean reservoirs traversed by well bores, particularly hydrocarbon-containing reservoirs. In one aspect this invention relates to a method for determining the amount of residual oil in an oil bearing formation by radioactive well logging techniques in which radioactive tracer materials are employed. In yet another aspect, this invention relates to a method for determining the amount of residual oil present in subterranean reservoirs traversed by well bores wherein such residual oil saturation properties are detected by the use of a combination of radioactive well logging techniques, tracer injection techniques and reservoir flooding techniques.

2. Brief Description of the Prior Art

The importance of determining residual oil in place by means of sub-surface logging techniques has been recognized for some time. At the present new oil fields are becoming more difficult to discover and more attention is being given to secondary and tertiary methods of oil recovery in old fields. However, prior logging techniques have required substantial knowledge of the subterranean formation such as lateral penetration, make up of the formation, and the like if one is to obtain reliable information from such logging techniques. Therefore, while numerous methods have been and are being used to determine the amounts of residual oil present in reservoir formations, all of the prior art methods, regardless as to whether they employ core analysis, well testing, well logging, and the like, have certain limitations. Pitfalls and the rather unsatisfactory accuracy of the results using these conventional techniques have created a serious problem for the oil industry. Because of the high costs in recovering such residual oil through secondary or tertiary means, it is desirable and of utmost importance that an accurate, dependable method be developed for determing the amount of residual oil remaining in such formations. Until the present invention, there was no satisfactory method for accurately and inexpensively determining the amount of residual oil.

OBJECTS OF THE INVENTION

An object of the present invention is to provide a method for determining the amount of residual oil in a subterranean oil bearing formation.

Another object of the invention is to provide a new and improved technique for indicating directly the residual oil concentration in a subterranean formation by the use of radioactive well logging techniques.

Still another object of the present invention is to provide an improved, accurate technique, for determining the amount of residual oil in a subterranean formation which does not depend upon reservoir property variables.

Other objects, and advantages of the present invention will become apparent to those skilled in the art from a reading of the following detailed description.

SUMMARY OF THE INVENTION

According to the present invention, I have now discovered an improved technique for determining the amount of residual oil in an oil bearing formation penetrated by a well-bore. More specifically, I have found an improved technique for determining residual oil in place employing radioactive well logging techniques.

Specifically, the method for determining the residual oil in an oil bearing formation which has been penetrated by the bore hole of a well and having a known porosity includes the sequential steps of:

a. logging the formation to obtain logging data measurements as to the natural radioactivity of the formation;

b. injecting into the formation, through the borehole of said well, an aqueous solution containing water-soluble radioactive contaminants;

c. logging the formation for a second time to obtain radioactivity logging measurements of the formation, such measurements being indicative of relative quantities of residual oil and formation waters present in the formation;

d. injecting into the formation, through the borehole of the well, a sufficient amount of an oil miscible solution to displace substantially all of the residual oil in the formation surrounding the borehole;

e. injecting into said formation, through the bore hole of said well, a sufficient amount of water to displace substantially all of the oil miscible solution in said formation thereby rendering same substantially 100 percent water saturated; and, f. logging the formation for a third time to obtain radioactivity logging data measurement which, when compared with the logging data measurements of the first and second log, in combination with the porosity of said formation and the concentration of radioactive contaminates employed, indicates the amount of residual oil present in said formation.

In carrying out the logging measurements in the technique of this invention, any suitable radioactive well logging means can be employed. Further, accurate and reliable measurements can readily be obtained in clean and or shaly reservoir rock, each of which can be either water wet or oil wet.

DETAILED DESCRIPTION OF THE INVENTION

As previously stated, the present invention relates to a unique method for determining the residual oil present in oil bearing formation which have been penetrated by the bore hole of a well. Broadly speaking, the method employs a combination of radioactive well logging, tracer injection, and reservoir flooding techniques to determine the amount of residual oil present in a subterranean oil bearing formation. By employing the method of the present invention to determine the amount of residual oil present in an oil bearing formation, one readily overcomes all the objectionable features of the prior art processes enumerated above.

In determining the amount of residual oil present in an oil bearing formation, I have found that an accurate determination can be obtained wherein the formation, containing both residual oil and formation water, is logged by radioactive well logging techniques to obtain logging data information on the natural radioactivity of the formation. This data functions as a base or reference log. Once the natural radioactivity of the formation under investigation has been obtained, an aqueous solution containing water-soluble radioactive contaminants is injected into the formation through the bore hole of the well. The concentration of radioactive contaminants can vary widely, but are generally in an amount sufficient to provide from about $5 \times 10^{-2}$ to about 5 microcuries/cc of radioactivity in the injected fluid. It is preferred to use a fluid having about $5 \times 10^{-1}$ microcuries/cc. When the aqueous solution has been allowed or caused to be dispersed in the formation under investigation, a second log is made to measure the intensity of the radiation emitted by the radioactive contaminants now present in the formation.

When desirable, the aqueous solution containing the radioactive contaminants, can be dispersed throughout the formation under investigation by the use of a sufficient external pressure being applied through the borehole of said well to said aqueous solution. For example, such can be done by forming a hydrostatic head within the well bore, said hydrostatic head functioning as a hydraulic column for the transfer of pressure to the aqueous solution containing the radioactive contaminants. In addition, such procedure of employing external pressure can be employed when desirable to dissipate an oil miscible solution and water into said formation in subsequent steps which will be discussed in detail hereinafter. The logging data so obtained, when compared with the base logging data produces measurements indicative of the relative quantities of residual oil and formation waters present in the formation.

An oil miscible solution is then injected into the formation through the borehole of the well in a sufficient amount to displace substantially all of the residual oil in the formation surrounding the borehole. The amount of oil miscible solution employed is an amount sufficient to remove the residual oil from the formation in the area surrounding the borehole to a distance exceeding the radius of investigation of the logging means being employed to obtain the logging data. Upon completion of the injection of the oil miscible solution a sufficient amount of water is injected into the formation, through the borehole of the well, so that substantially all of the oil miscible solution is displaced, thereby rendering the formation being tested substantially 100 percent water saturated. The formation is then logged for a third time to obtain radioactive logging data measurements which, when compared with the logging data measurements of the first and second logs indicates the amount of residual oil present in the formation.

In carrying out the logging measurement of the present invention any suitable gamma ray logging means which are well known in the art can be employed. Such means measure the rate at which thermal neutrons are captured after a burst of high-energy neutrons have been emitted from a neutron generator. A description of one system for making such measurements is contained in an article entitled "Neutron Lifetime, a New Nuclear Log" by A. H. Youmans, et al., on Page 319, Journal of Petroleum Technology, March, 1964. A log that measures the decay rate of thermal neutrons is especially useful, since it will operate equally well in cased wells or uncased wells. Thus, theroretically, it is possible to measure the residual oil in place in both a cased or uncased well by using the process of the present invention, especially in conjunction with such logging techniques.

Logging tools of the type described above measure the rate of neutron decay following a burst of neutrons from a downhole generator. By employing the method of the present invention, one is not troubled with previous prior art problems, but one obtains direct radioactivity logging data measurements which indicate, with a high degree of accuracy, the amount of residual oil present in the formation.

After the natural radioactivity of the formation under investigation has been determined an aqueous solution containing water-soluble radioactive contaminants, eg. tracers, is injected into the formation through the bore hole of the well. Any suitable radioactive contaminant can be employed and such can be either synthetically produced or natural occurring radioactive constitutents. For example, especially desirable results are obtained wherein the radioactive constitutents are radioactive inorganic salts such as iodine salts, sodium salts, bromine salts, and cobalt salts. Such salts are well known in the art. These inorganic salts are rendered radioactive by radioactive bombardment, a process also well known, to produce the desired radioactive contaminants. Examples of such salts are potassium iodide, potassium bromide, sodium iodide, sodium bromide, cobaltous chloride and antimony trichloride. Thus, any suitable water-soluble radioactive contaminant can be employed, the only criteria other than the solubility factor being that the contaminant be one whose elements emit intense gamma radiation that is readily detectable with conventional gamma log means.

The water employed in producing the aqueous solution is formation brine which has been produced at the well. By employing such formation water, one eliminates the possibility of additional factors of uncertainty and unknown variables.

After the aqueous solution containing the radioactive contaminants has been thoroughly dispersed into the formation, a second radioactive log measurement is obtained using any suitable logging means such as described previously in the obtaining of the reference or base log. The logging data measurements so obtained, when compared with the reference log, are indicative of the amount of the residual oil and formation waters present in the formation under investigation. In order to determine accurately, the amount of residual oil present it is desirable, according to the practice of this invention, to remove substantially all of the residual oil from the formation under investigation so that said formation becomes substantially 100 percent water saturated. Such is accomplished by injecting into the formation, through the bore hole of the well, a sufficient amount of an oil miscible solution to displace substantially all of the residual oil in the formation surrounding the bore hole. As previously stated, the amount of oil miscible solution employed will vary widely, but it is required that a sufficient amount be employed to remove substantially all of the residual oil from the formation in the area surrounding the bore hole to a distance exceeding the radius of investigation of the logging means being employed.

Any suitable oil miscible solution can be employed in carrying out the washing of the residual oil from the formation. Such techniques are known in the industry as flooding techniques, and any suitable miscible flooding technique can be employed.

The term miscible flooding as used herein is to be understood to include chemical flooding procedures and other well known procedures such as solvent displacement, micellar solution, microemulsion and the like.

When employing a chemical flood, an effective amount of an aqueous solution containing a surface active agent is injected into the formation being tested. The concentration of surface active agent in the aqueous solution can vary widely but will generally vary within the range of from about 0.5 to 60 weight percent. The particular concentration employed will also be dependent on the viscosity of the formation oil encountered. Such surface active agents and chemical flooding techniques are well known in the art. Illustrative of surface active agents which can be employed in chemical flooding processes are:

A. Nonionic:
  I. Products obtained by autocondensation of various fatty matter and their derivatives with ethylene oxide, propylene oxide, glycols, or glycerols:
     a. a fatty acid plus ethylene oxide or glycerol, such as palmitic acid plus 5 moles ethylene oxide or glycerol monostearate;
     b. an alcohol plus ethylene oxide, such as hydroabietyl alcohol plus 15 moles ethylene oxide;
     c. an ester of aldehyde plus ethylene oxide.
     d. an amide or amine plus ethylene oxide, such as diethanolamine plus 15 moles ethylene oxide.
  II. Products obtained by condensation of phenolic compounds having lateral chains with ethylene or propylene oxide. Examples are disecbutyl phenol plus 10 moles ethylene oxide and octyl phenol plus 12 moles ethylene oxide.

B. Cationic:
  I. Neutralization product of primary, secondary, or tertiary amine with an acid such as trimethyl octyl ammonium chloride, lauryl dimethyl benzyl ammonium chloride and the like, commonly referred to as quaternary ammonium chlorides.

C. Anionic:
  I. Alkyl aryl sulfonates such as ammonium isopropyl benzene sulfonate;
  II. Fatty Alcohol sulfates such as sodium 2-methyl-7-ethyl-4 hendecyl sulfate;
  III. Sulfated and sulfonated amides and amines such as sodium N-methyl-N-oleyl taurate;
  IV. Sulfated and sulfonated esters and ethers such as dioctyl sodium sulfo succinate;
  V. Alkyl sulfonates such as sodium dodecyl sulfonate.

D. Ampholytic:
  I. Molecules where the molecules as a whole forms a zwitterion, such as cetylaminoacetic acid.

A reference book which describes many types of surfactants suitable as foaming agents is "Surface Active Agents and Detergents", volumes I and II, by Schwartz et al., Interscience Publishers.

Another method which can be employed for displacing the residual oil in the formation being investigated is known as miscible flooding and is set forth in U.S. Pat. No. 3,170,513, issued Feb. 23, 1965, and entitled "Method of Miscible Flooding". In this method a suitable volume of low molecular weight hydrocarbons is employed as the displacement hydrocarbon in combination with water. Once the low molecular weight hydrocarbon and water have been injected into the formation, a gas, in combination with water, is injected into the formation to push the displacement hydrocarbon through the oil bearing formation, thereby displacing the residual oil in the formation under investigation. Injection of the displacement hydrocarbon together with water is done in such volumes that a sufficient amount is placed in the reservoir to permit a miscible displacement of the reservoir oil by the displacement hydrocarbon and miscible displacement thereof by the gas.

The total injected hydrocarbon necessary to maintain miscible displacement within the reservoir should be an amount from about 3 to about 15 percent, preferably 5 percent, of the hydrocarbon-filled pore space of the reservoir, as readily determinable by means known in the art. The mixture of displacement hydrocarbon and water moves through the reservoir in the same areas without appreciable gravity separation due to the fact that the injection hydrocarbon moves through the interior of the channels between the particles to displace the hydrocarbons, and the water moves through the remainder of the channels and adjacent the connate water. Therefore, the injected hydrocarbon provides displacement efficiency, and the water provides volumetric efficiency. Movement of a fluid through porous media is related to the saturation or proportion of the fluid present due to the inherent effects of the relative permeabilities of the reservoir. The velocity of movement of water or a hydrocarbon is calculated at any given saturation from the relative permeability at that saturation, the fluid viscosity, and the saturation change from the previous condition to the saturation under consideration. In the mixture of displacement hydrocarbon and water injected, the proportion of water is such that the velocity of movement of water is in excess of the velocity of liquid petroleum gas by at least 5 percent, and preferably in the order of 30 to 50 percent, thereby allowing larger volumes of water to be utilized during the injection of the hydrocarbon volume required for efficient miscibility.

The miscible displacement technique is also disclosed and set forth in U.S. Pat. No. 3,249,157 issued May 3, 1966 and entitled "Recovery Process for Producing Petroleum". Fluids which can be used to miscibily displace oil from the reservoir under investigation are set forth to include, but are not limited to, gaseous and liquified butane and propane, liquified petroleum gas (L.P.G.), acetone, propyl alcohol, dioxane, carbon tetrachloride and ethane. Non-hydrocarbon fluids miscible with, or highly soluble in, the oil at relatively higher pressures can be used and include carbon dioxide, hydrogen sulfide, nitrous oxide, and sulfur dioxide.

Micellar solutions can also be employed in the flooding of the formation to displace the residual oil by a miscible-type mechanism. In employing this technique, a slug of micellar solution is injected into the reservoir, followed by a bank of thickened water to prevent premature break-through of the final drive water. Generally, a 3 to about 20 percent pore volume slug of the micellar solution is employed; and, the amount of thickened water is sufficient to insure that the micellar solution has been forced completely into the formation being tested. These micellar solutions are surfactant-stabilized dispersions of oil and water, and may contain small quantities of other additives. Generally, the micellar solution contains:

1. Water or a water solution of one or more inorganic solutes that remain soluble when the solution is contacted by the components of the reservoir formation;
2. At least one surface active material having the properties that normally characterize a surfactant and as defined previously; and 3. An amphiphilic coupling agent comprising a polar organic material having a low water solubility.

Suitable aqueous liquids include: water; water solutions of alkali metal hydroxides, such as sodium hydroxide, potassium hydroxide, and the like; water solutions of salts such as sodium carbonate, sodium chloride, sodium bisulfate, and mixtures thereof. The pH of the aqueous liquid is preferably adjusted to one that is compatible with both an active form of the surfactant and the materials that will be encountered during the passage of the liquid through the reservoir formation.

Suitable surfactants include: the soaps of fatty acids, such as oleic, linoleic, hydroxy stearic, etc.; the soaps of mixed organic acids, such as the tall oil fatty acids, tall oil pitch, rosin acids, the petroleum naphthenic acids, and the soybean oil fatty acids; the surface active organic sulfonates and sulfonic acid salts, the nonionic and cationic surface active materials, and the like, e.g., surface-active materials such as those described under the classification of detergent compounds in *Industrial Detergency* by William W. Niven, Jr., Reinhold Publishing Co., New York, 1955.

Suitable amphiphilic coupling agents include: the higher molecular weight, monohydroxy aliphatic and alicyclic alcohols, such as those containing six or more carbon atoms; the aromatic hydroxylic compounds such as the phenols, and cresols; the pine oils; the sterols; cholesterols; bile salts; fatty acids containing six or more carbon atoms; amines or esters of low water solubility.

In forming the present solubilizing solutions, the selection of the concentration at which the surfactant is dissolved in the aqueous liquid is preferably based on the critical concentration for micelle formation (abbreviated CMC) for such a system at the temperature of the reservoir formation. The surfactant concentration is preferably at least equal to the CMC proportions and may exceed them to the extent that is economically advantageous. In general, increasing the proportion of surfactant increases the oil solubilizing capacity, the viscosity and the cost of the solubilizing solution. The selection of the concentration at which the amphiphile is dissolved in the surfactant micelles is preferably based on the amount required to saturate the solution at the temperature of the reservoir formation. This can be determined by maintaining a portion of the aqueous liquid solution of the surfactant micelles at the temperature of the reservoir formation and adding portions of the amphiphile until the addition of an additional portion causes the solution to remain turbid. The amphiphile concentration is preferably one lying between the proportion of the amphiphile that is required to saturate the aqueous liquid and the proportion that is required to saturate the micelles.

The bank of thickened water is employed as a mobility buffer to assure stable movement of the slug of micellar solution. The thickening agent can be any suitable agent such as high molecular weight water-soluble polymers which are well known in the art, e.g. polyacrylamide, sulfonated polystyrene, and the like.

Yet another technique which can be employed to remove substantially all of the residual oil from the formation under investigation is known as the microemulsion oil recovery process in which microemulsion forming solutions are employed to drive the oil from the formation. Such a process is disclosed in U.S. Pat. No. 3,373,809, issued Mar. 19, 1968 and entitled "Microemulsion Oil Recovery Process" and U.S. Pat. No. 3,254,714, issued June 7, 1966 and entitled "Use of Microemulsions in Miscible-Type Oil Recovery Procedure", each of which are hereby incorporated by reference.

In this process, a small bank of an oil component, such as petroleum crude, "light end" kerosene, toluene, or other light aromatic oils, paraffinic oils, and the like, is injected into the formation under investigation. Thereafter, an aqueous slug containing suitable concentrations of polar organic compounds and surfactants is injected into the formation. The concentrations of the polar organic compounds in the aqueous slug can vary widely, as can the concentrations of the surfactants. Generally the concentration of the polar organic compound or compounds will range from about 15 to 60 percent by weight, depending primarily upon the selection of the surfactant, and the relative ease with which the reservoir oil or injected oil forms microemulsions. The concentration of surfactant(s) will generally range from about 5 to 40 percent by weight, based on the total weight of the injected aqueous solution.

Suitable examples of polar organic compounds for use in accordance with the invention include the n-, cyclo-and iso-alcohols having 4–16 carbon atoms per molecule; the n-, cyclo- and iso-amines having 5–12 carbon atoms per molecule; phenol and phenols having side chains with 1–10 carbon atoms per molecule; n-, cyclo- and isomercaptans having 2–10 carbon atoms per molecule; glycols having 2–12 carbon atoms per molecule; fatty acids having 6–22 carbon atoms per molecule; glycerols having 3–18 carbon atoms per molecule; ketones having 5–18 carbon atoms per molecule; ethers having 4–18 carbon atoms per molecule; aldehydes having 4–18 carbon atoms per molecule; and mixtures of two or more of the above. All these molecules may contain saturated or unsaturated carbon-carbon bonds.

Suitable surfactants include anionic and nonionic compounds, for example, sulfonated aromatic hydrocarbons, ethylene oxide condensates of aliphatic acids, alkyl aryl polyalkylene glycol ethers, esters of sulfosuccinic acid, mono- and dibasic carboxylic acids, alkyl and aryl sulfates; specific examples of which include isopropyl naphthalene sodium sulfonate, sulfonated petroleum distillates, ethylene oxide condensates of coco fatty acids, octylphenyl polyoxyethylene ether, diisoctyl sodium sulfosuccinate, perfluocaprylic acid, diisohexyl succinic acid, dodecyl sulfate and amylphenyl sulfate.

Specific combinations of a polar organic compound and a soap or detergent for use in the present invention include phenyl and sodium oleate; phenol and sodium abietate; phenol and ethanolamine oleate, pine oil and sodium oleate; glycerol and turkey red oil; diethylene glycol and turkey red oil; octyl alcohol and potassium myristate; octylamine and potassium myristate; octyl mercaptan and potassium myristate; cetyl alcohol and oleic acid; p-methyl cyclohexanol and oleic acid; oleic acid and sodium oleate; n-amyl alcohol and an octylphenyl polyoxyethylene ether obtained by reacting 13 mols of ethylene oxide with octyl-phenol (Triton X-102).

Other suitable techniques can be employed to displace the residual oil in the formation. Such other methods indluce, but are not limited to, alcohol displacement techniques, overbased surfactant water flooding techniques and any other suitable flooding techniques or oil displacement techniques which are well known in the art.

Once the residual oil has been removed from the formation under investigation by any suitable flooding treatment such as those described above, the formation is then saturated with water, either original formation water or brine water, so that the formation is a substantially 100 per cent water bearing reservoir formation.

A third log is run on the water saturated formation to obtain logging data measurements. These measurements obtained by the second log and the difference in combination with the porosity of the formation, represents the amount of residual oil present in the formation. As is evident, the initial log, the base or reference log, is employed to calibrate the second log so that the difference between the third log date measurements and the second log data measurements represents the amount of the residual oil present in the formation. The porosity of the formation will be constant for all three logs and such can readily be obtained by core analysis and the like.

To better illustrate the invention the following example is set forth. However, it is to be understood that the example is for illustrative purposes only and is not intended to limit the scope of the present invention.

EXAMPLE I

In order to determine the residual oil present in a formation which has been penetrated by the bore hole of a well, the sequential steps are as follows:

1. A Gamma Ray log is made on the formation in question to determine the natural radioactivity of the formation. This log, designated GR 1, functions as a base or reference log.
2. An aqueous solution containing about water-soluble radioactive contaminants (e.g. radioactive potassium iodide) is injected into the formation through the bore hole of said well.
3. A second Gamma Ray Log is made of the formation to determine oil and water streaks in the formation. This log is designated as GR 2.
4. An aqueous solution containing a surface active agent (an overbase sulfonate deprived from a petroleum refining system, e.g. pale oil extract as set forth in U.S. patent application Ser. No. 322,992, is injected into the formation through the bore hole of the well. Sufficient solution is injected to insure that the residual oil has been displaced from the vicinity of the bore hole to a distance exceeding the radius of investigation of the logging tool.
5. Water (formation brine) is then injected into the chemically cleaned formation to resaturate same and thus cause same to be substantially 100 per cent water bearing formation rock.
6. A third Gamma Log is then made on the formation and designated GR 3.

Mathematically, the method of the present invention for determining the amount of residual oil present in an oil bearing formation can be expressed based upon the following relationships:

| Logging run | | Gamma Ray response |
|---|---|---|
| 1 | f ($\phi$, Tracer Concentration) | = GR1 |
| 2 | f ($\phi$, Tracer Concentration) | = GR2 |
| 3 | f ($\phi$, Tracer Concentration) | − GR3 | where porosity ($\phi$) stays constant from log run to log run; $\phi$ is available from other source (logs, cores).

$\phi(GR3 - GR2) = ROS$ where $\phi$ is the porosity of the formation as determined by core analysis GR3 and GR2 are as defined above, and ROS is the residual oil saturation. It is to be understood that proper calibration between the concentration of the radioactive contaminate and Gamma Ray response must be established.

From the above example and detailed descriptions of the preferred embodiments it can readily be seen that by employing the method of the present invention one can accurately determine the amount of residual oil remaining in an oil bearing formation after primary production of said formation. In addition, it is evident that certain modifications can be made in the practicing of the method of the present invention without departing from the scope of same which is defined in the appended claims.

Having thus described the invention, I claim:

1. A method for determining the residual oil in an oil bearing formation penetrated by the bore hole of a well comprising the steps of:
   a. Logging said formation with a radioactive detection means to obtain logging data measurements of the natural occuring radioactivity of said formation;
   b. Injecting into said formation, through the bore hole of said well, in aqueous solution containing water-soluble radioactive contaminants said water-soluble radioactive contaminants being present in an amount sufficient to provide from about $5 \times 10^{-2}$ to about 5 microcurries/cc of radioactivity in said aqueous solution;
   c. Logging said formation for a second time with said radioactive detection means to obtain second logging data measurements of said formation, such measurements being indicative of the relative quantities of residual oil and formation waters present in said formation;
   d. Injecting into said formation through the bore hole of said well, a sufficient amount of an oil miscible solution to displace substantially all of the residual oil in the formation surrounding the bore hole;
   e. Injecting into said formation, through the bore hole of said well, a sufficient amount of water to displace substantially all of the oil miscible solution in said formation thereby rendering same substantially 100 percent water saturated;
   f. Logging said formation for a third time to obtain logging data measurements, which when compared with said first and second logging data measurements, in combination with the known porosity of said formation and the concentration of radioactive contaminants employed, indicates the amount of residual oil present in said formation; and,
   g. Comparing the logging data of (a) the logging date of (c) and the logging data of (f) to determine the amount of said residual oil present in said oil bearing formation.

2. The method of claim 1 wherein external pressure is applied, through said bore hole of said well, to the aqueous solution containing radioactive contaminants, the oil miscible solution, and water to insure same are completely dispersed within the formation under investigation.

3. The method of claim 1 wherein said water-soluble radioactive contaminants are radioactive inorganic salts.

4. The method of claim 3 wherein said radioactive inorganic salt is selected from the group consisting of radioactive potassium iodide, radioactive potassium bromide, a radioactive sodium iodide, radioactive sodium bromide, radioactive cobaltous chloride and radioactive antimony trichloride.

5. The method of claim 3 wherein said oil miscible solution is an aqueous solution containing from about 0.5 to 60 weight percent of a surface active agent.

6. The method of claim 5 wherein said surface active agent is an overbased pale oil extract sulfonate.

7. The method of claim 3 wherein said oil miscible solution is a mixture of liquified low molecular weight hydrocarbon and water, said hydrocarbon being present in an amount of from about 3 to 15 percent of the reservoir hydrocarbon pore space and said water being present in the amount such that the movement velocity of said water in said reservoir is greater than the movement velocity of said hydrocarbon in said reservoir.

8. The method of claim 3 wherein said oil miscible solution is a micellar solution and from about 3 to 20 percent pore volume of said micellar solution is injected into said formation.

9. The method of claim 3 wherein said oil miscible solution is a microemulsion forming solution and said microemulsion forming solution is an aqueous solution containing from about 15 to 60 weight percent of a polar organic compound and from about 5 to 40 percent by weight, based on the total weight of said aqueous solution, of a surface active agent.

10. The method of claim 9 which includes the step of injecting a minor amount of oil component miscible with the reservoir oil into said formation prior to injection of said microemulsion forming solution.

* * * * *